United States Patent [19]

Buckley et al.

[11] 4,159,660
[45] Jul. 3, 1979

[54] BIAXIAL TURNING MACHINE WITH MEANS FOR BIDIRECTIONAL INDEPENDENT TOOL COMPENSATION

[75] Inventors: James E. Buckley, Sterling Heights; Thomas E. McKendrick, Westland; Lee E. North, Farmington; Nathan Mendelsohn, Southfield, all of Mich.

[73] Assignee: Ex-Cell-O Corporation, Troy, Mich.

[21] Appl. No.: 879,527

[22] Filed: Feb. 21, 1978

[51] Int. Cl.$^2$ .............................. B23B 3/20; B23B 3/30
[52] U.S. Cl. ............................................... 82/3; 82/2 B; 82/2 D; 82/21 B
[58] Field of Search ................... 82/3, 2 B, 2 D, 21 B

[56] References Cited

U.S. PATENT DOCUMENTS

| | | | |
|---|---|---|---|
| 2,611,290 | 9/1952 | Bullard | 82/3 X |
| 2,701,495 | 2/1955 | Staples | 82/2 D |
| 3,365,989 | 1/1968 | Bullard et al. | 82/3 |
| 3,635,109 | 1/1972 | Jacobson | 82/3 X |
| 3,715,938 | 2/1973 | Ledergerber et al. | 82/2 B |
| 3,813,745 | 6/1974 | Kuck et al. | 82/2 B |

*Primary Examiner*—Leonidas Vlachos
*Attorney, Agent, or Firm*—Reising, Ethington, Barnard, Perry & Brooks

[57] ABSTRACT

A multi-spindle, biaxial turning machine having means for independent tool offset in either of the axes of tool movement. The turning machine includes a slide assembly comprising a compound slide movable in a first direction with respect to the spindle axes of rotation, a cross slide mounted in sliding relation on the compound slide and movable in a direction transverse to the spindle axes of rotation, and first and second auxiliary slides, each of the auxiliary slides mounted in sliding relation to the cross slide and carrying respective first and second tool holders movable in mutually transverse directions. The compound slide, cross slide, and auxiliary slides each have associated with them drive means, which in the preferred form include a servo-drive motor and associated ball screw drive. A motion sensor is associated with each of the drive means. A control circuit is responsive to an operator command, and includes a plurality of independent control channels, each of the plurality of control channels being associated with and controlling a slide.

10 Claims, 3 Drawing Figures

BIAXIAL TURNING MACHINE WITH MEANS FOR BIDIRECTIONAL INDEPENDENT TOOL COMPENSATION

TECHNICAL FIELD

The present invention relates to turning machines, and more particularly to a biaxial, multi-spindle turning machine having means for independent, bidirectional tool offset in each axial dimension.

BACKGROUND OF THE INVENTION

In the general form of a turning machine, a workpiece is turned by a spindle having an axis of rotation. A machining tool, such as a cutting tool, is mounted in a tool holder that is movable through a range of positions adjacent the axis of rotation. The workpiece can be shaped into the desired form by selectively moving the tool holder with respect to the axis of rotation to change or alter the point of engagement of the tool with the workpiece. In modern turning machines the motion of the tool holder is controlled by a numerical control unit that contains a stored program with instructions for the movement of the tool holder.

Increased productivity can be realized by equipping the turning machine with more than one spindle to perform more than one simultaneous turning operation. In this form of turning machine, a plurality set of tool holders, equal in number or sets to the number of spindles, are mounted on a common slide that moves each tool holder through a range of positions with respect to the axis of rotation of its respective spindle. The machining operation may then be accomplished by moving the entire slide through a sequence of operations under the control of a stored program in a numerical control unit.

A problem that is invariably associated with automatically controlled turning machines is the need for tool offset. More specifically, the position of a tool will frequently need to be recalibrated or offset to accommodate certain operating parameters affecting proper tool position. Some of these operating parameters are, for example, tool wear; tool displacements due to thermal and structural deflections of the turning machine support structure; tool presetting errors; tool insert size errors; and programming and/or processing errors in the control unit. When the influence of one or more of these parameters causes the tool position to be outside the tolerance limits, then tool offset must be made to bring the tool back into proper positional relationship with respect to its associated spindle.

The problem of tool offset or recalibration becomes even greater when multi-spindle turning machines are used. More specifically, each of the plurality of tools on the multi-spindle turning machine may require independent offset or recalibration due to such factors as uneven tool wear or errors in tool size or presetting. In this instance, each tool holder mounted on the common slide must be movable with respect to every other tool holder on the slide. In the specific example of a turning machine having first and second spindles, a first tool holder is fixedly mounted on the slide, and a second tool holder is movably mounted on the slide with respect to the fixed position of the first tool holder.

The problem becomes increasingly complex where machining operations are done in two dimensions with respect to the axis of rotation of the spindle. The two-dimensional or biaxial turning machine requires a first, compound slide to move in a first direction with respect to the spindle axes of rotation, and a second, cross slide, mounted in sliding relation to the compound slide, to move in a second direction transverse to the direction of motion of the compound slide. First and second auxiliary slides are mounted in sliding relation on the cross slide and are movable parallel to the compound slide and cross slide, respectively. Each of the auxiliary slides carries a tool holder or turret with a plurality of tool holders.

The patent to Dormehl et al, U.S. Pat. No. 3,754,178 proposes a control system for tool offset in a multi-spindle, single axis turning machine. However, its disclosure is concerned only with a single axis of a turning machine, and does not address the further problems which may require bidirectional, independent tool offset in a biaxial turning machine. Moreover, the Dormehl et al control system requires rather elaborate signal processing circuitry to accomplish independent tool offset. Specifically, it requires two signal comparisons, a signal summing and a signal inversion to effect an independent offset of one tool holder with respect to the other.

It is an objective of the present invention to provide a multi-spindle, biaxial turning machine that includes a control system for providing independent tool offset in either of two dimensions. Moreover, another objective of the invention is to provide a relatively simplified machine and control system design that does not require elaborate signal processing circuitry.

DISCLOSURE OF THE INVENTION

A turning machine in accordance with the present invention provides biaxial machining operation with independent offset for each tool in each axial dimension. The turning machine includes a control system that responds to a command for a tool offset with minimal signal processing complexity.

The preferred form of the invention contemplates a turning machine having first and second spindles with parallel axes of rotation. A compound slide is movable with respect to a support structure in a first direction with respect to the axes of rotation. A cross slide is mounted on the compound slide and is movable in a second direction transverse to the first direction. First and second auxiliary slides are mounted on the cross slide for movement in the first and second directions, respectively. Each of the auxiliary slides carries a tool holder. In the disclosed embodiment, the tool holders each take the generalized form of a turret that includes a plurality of several different tools, each of which may be selected by an operator for a particular machining operation. Each of the machine slides, namely the compound slide, cross slide, and first and second auxiliary slides, has associated with it a motor or similar type axis drive means. Each motor or axis drive means has associated with it a sensor that is responsive to a change in slide position.

When it is determined that an offset is required, the operator enters into a control unit associated with the turning apparatus information as to the particular tool requiring offset and the dimension in which it is to be offset. In addition, if the offset requires motion of either the compound slide or cross slide, the operator enters a counter-offset command that counteradjusts the tool on the cross slide that does not require an offset or the same amount of offset. Each command is then processed by a control circuit that includes an independent servo-feedback loop for each of the motive means. In the preferred form of the invention, the control of each of the motive means entails only a single comparison of the command with the sensor signal associated with that motive means.

A fuller appreciation of the present invention can be realized from a reading of a specific embodiment hereinafter disclosed, which is to be taken in conjunction with the drawings.

BEST MODE FOR CARRYING OUT THE INVENTION

Figure 1:
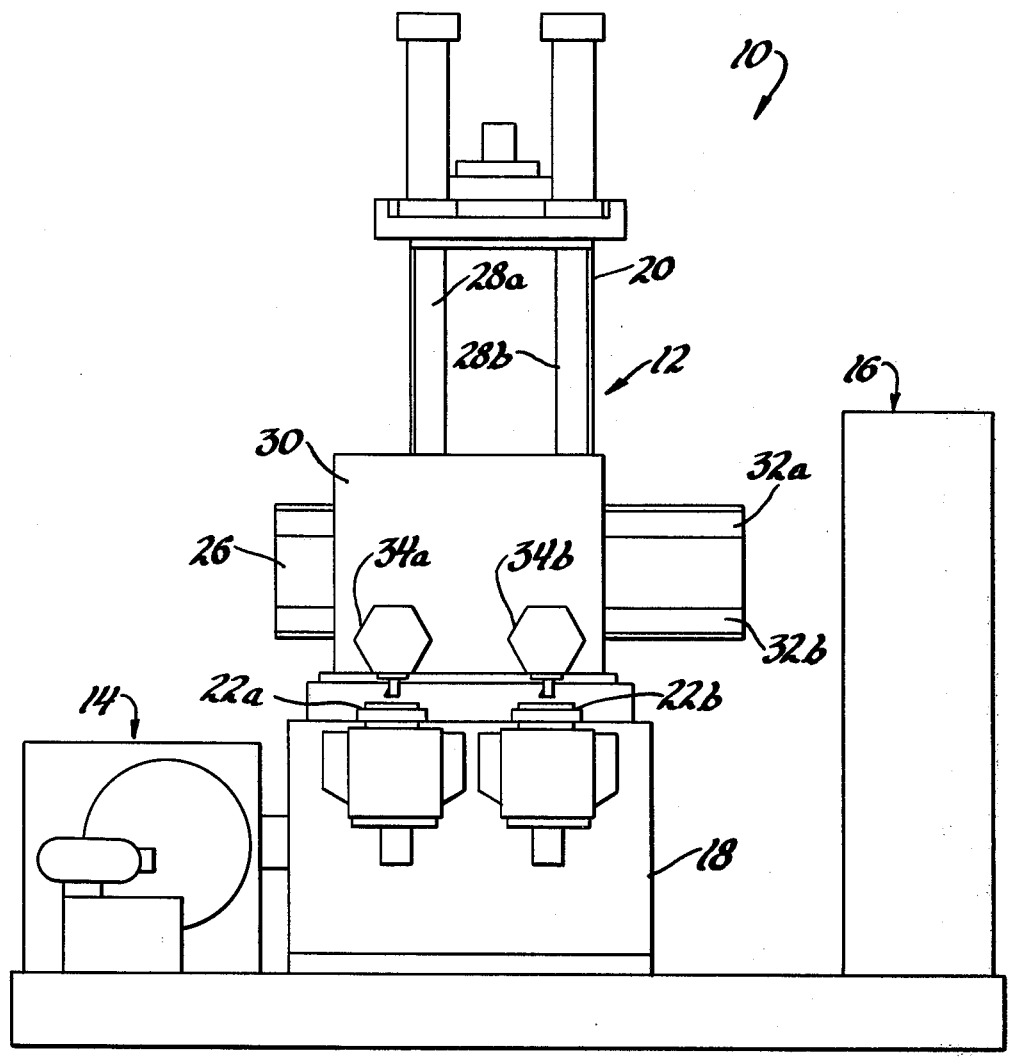
FIG. 1 is a schematic elevational view of a multi-spindle, biaxial turning machine in accordance with the present invention.

A turning machine in accordance with the present invention is shown generally at 10 in FIG. 1. This is one of the possible embodiments of the invention. It can be used as well in any configuration of multi-spindle machine where individual tool compensation may be required. The turning machine 10 is broken down into three basic sub-parts, including a multi-spindle turning machine 12, a motor drive system 14 for the machine, and a numerical control unit 16 which contains a stored program and implementing circuitry that controls the operation of the machine. The control unit 16 may, for example, be the commercially available unit manufactured by Allen-Bradley Co., Systems Division, 747 Alpha Drive, Highland Heights, Ohio 44143, in the Model 7300 product line.

The multi-spindle machine 12 includes support means comprising a knee 18 and vertical column 20. A pair of spindles 22a and b are adapted to hold and rotate a pair of workpieces in a machining operation. The spindles have parallel axes of rotation, which in the preferred embodiment are parallel to the longitudinal axis of the column 20. The motor drive system 14 provides power to rotate the spindles 22a and b.

A compound slide 26 is mounted on the vertical column 20. The compound slide 26 slides over the vertical dimension of the column 20 parallel to the axes of rotation of the spindles 22a and b on a pair of guideways 28a and b formed on the column.

A cross slide 30 is in turn mounted on the compound slide 26. The cross slide 30 slides in a direction transverse to the axes of rotation of the spindles 22a and b on a second pair of guideways 32a and b on the compound slide 26.

A pair of turrets 34a and b are mounted on the cross slide 30 and spaced from one another equidistant with the spacing of the axes of rotation of the spindles 22a and b. Each of the turrets 34a and b holds a plurality of tools that may be independently selected by the operator. The turrets 34a and b each also are mounted on a respective auxiliary slide in a manner that will hereinafter be discussed in greater detail.

Figure 2:
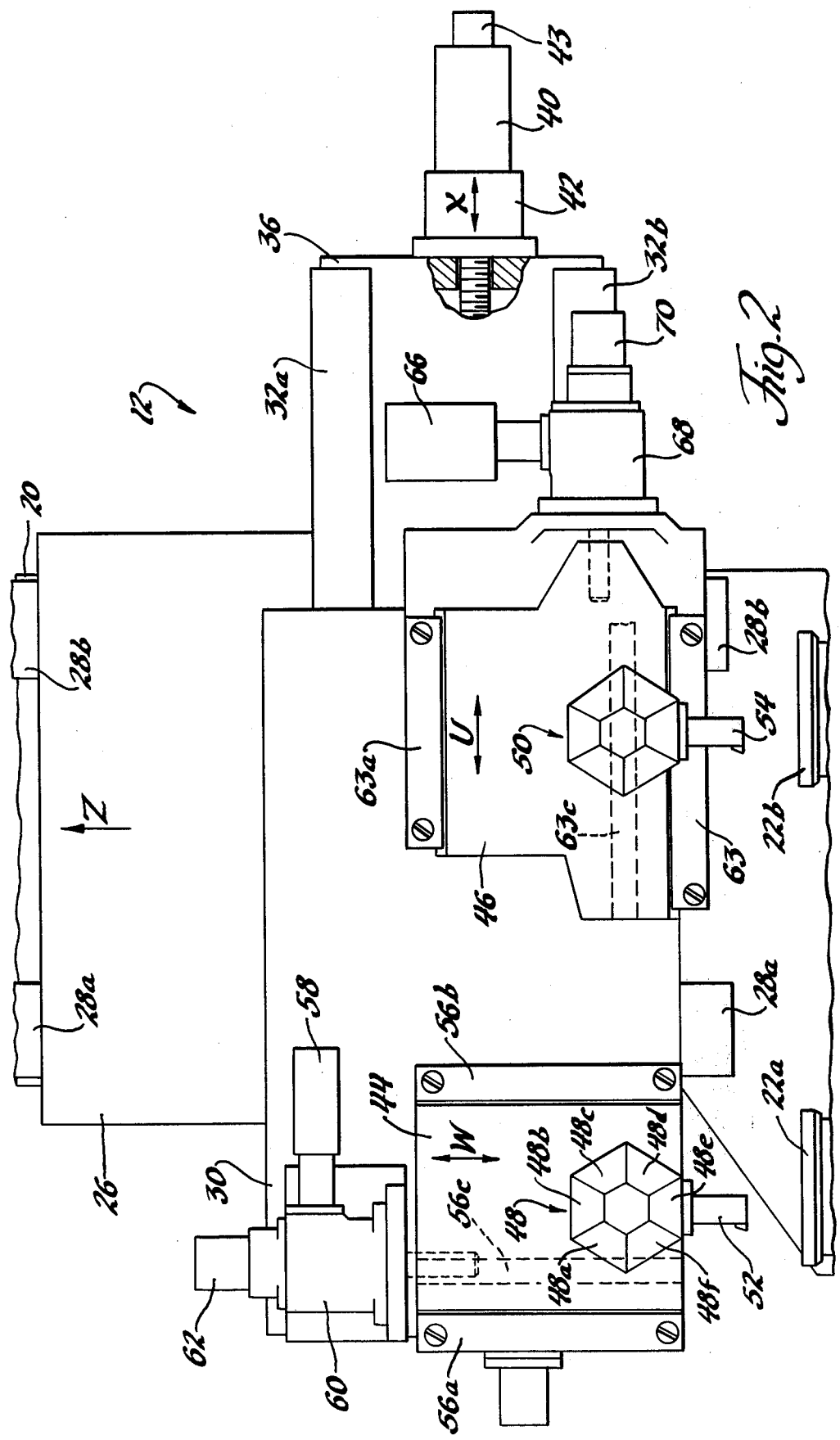
FIG. 2 is an enlarged representation of a portion of FIG. 1, illustrating in greater detail the biaxial slide assembly.

Reference is now made to FIG. 2, which shows the portion of the machine 12 pertinent to an understanding of the present invention. The column 20 has formed on it the first pair of guideways 28a and b. Each guideway 28a and b is in parallel, spaced relation to the other, and is preferably formed of hardened, ground steel. The compound slide 26 has formed on its underside a complementary pair of channels or grooves bonded with low friction material for smooth slide response that allows the compound slide to be driven back and forth over the vertical dimension of the column 20, along what will hereinafter be referred to as the Z-axis. The compound slide is driven by drive means (not shown in the view) that preferably includes a servo-drive motor and associated ball screw drive. A slide position transducer (not shown) is associated with the drive means and produces a signal representative of slide position.

The cross slide 30 is carried on a saddle 36 formed as part of the compound slide 26. The saddle 36 includes a second pair of guideways 32a and b. Each of the guideways 32a and b is likewise preferably formed of hardened, ground steel. The guideways 32a and b are in spaced, parallel relation to one another along a second direction transverse to the Z-axis. The underside of the cross slide 30 is provided with a pair of complementary shaped channels or grooves bonded with low friction material that allows the cross slide 30 to be moved over the saddle 36 in the second direction, which is hereinafter referred to as the X-axis. The cross slide 30 is equipped with drive means including a servo-drive motor 40 and an associated ball screw drive 42. A position sensor 43 is associated with the drive means and produces a signal representative of cross slide position.

A pair of auxiliary slides 44 and 46 are mounted on the cross slide and nominally spaced from one another equidistant with the spacing between the axes of the spindles 22a and b. The auxiliary slides 44 and 46 carry turrets 48 and 50, respectively. Each of the turrets 48 and 50 may be rotated by the operator through multiple index positions, each position brings into operation a different tool, as exemplified by tools 52 and 54. In the present case, each turret 48 and 50 is illustrated as having six distinct positions; for example turret 48 includes positions 48a, b, c, d, e and f.

The auxiliary slide 44, shown leftmost in the drawing figure, is mounted within a pair of parallel, spaced keepers 56a and b and is guided by a way 56c that allows the left auxiliary slide to be moved relative to the cross slide in a direction parallel to the Z-axis. The axis of travel of the left auxiliary slide 44 will hereinafter be referred to as W-axis. The auxiliary slide 44 is driven by a servo-drive motor 58 and associated ball screw drive 60. A resolver 62 or similar type position sensor is responsive to the position of the ball screw drive 60, to produce an output signal representative of the position of the slide 44. Each of the drive means associated with a compound slide 26 and cross slide 30 may also employ encoders as position sensors.

The other auxiliary slide 46, shown rightmost in the drawing, is mounted within a pair of parallel, spaced keepers 63a and b and is guided by a way 63c that allows the right auxiliary slide to be moved with respect to the cross slide 30 in a direction parallel to the X-axis. The direction of travel of the right auxiliary slide 46 will hereinafter be referred to as the U-axis. The right auxiliary slide 46 has associated with it drive means including a servo-drive motor 66 and associated ball screw drive 68. A resolver 70 or similar type position sensor is responsive to the position of the ball screw-drive 68, to produce an output signal representative of the position of the auxiliary slide 46.

Figure 3:
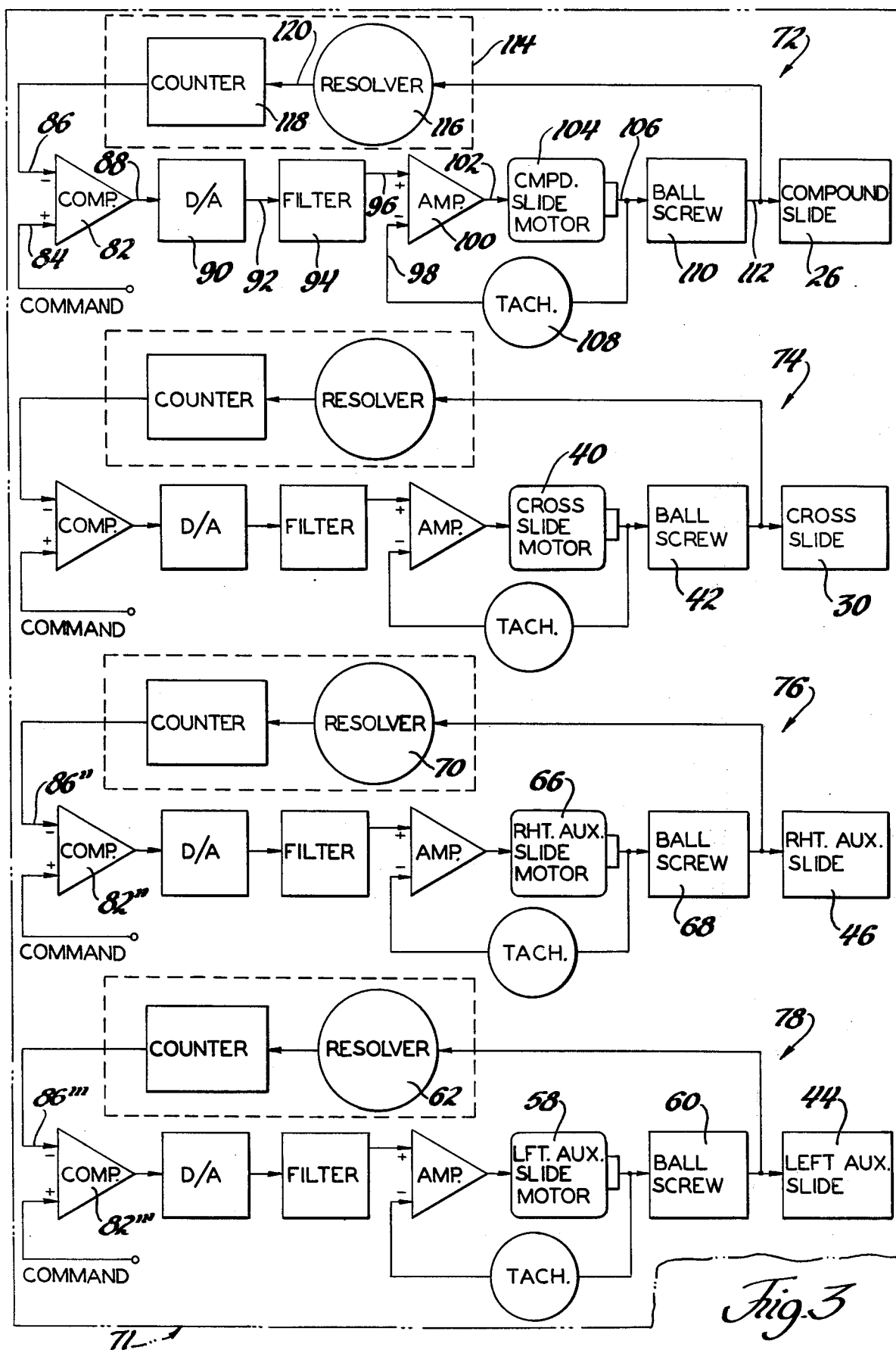
FIG. 3 is a schematic representation of a control circuit used to control the position of each of the movable slides of FIG. 2.

Reference is now made to FIG. 3, where there is illustrated a control circuit, generally at 71, that has as its function the controlling of the offset or compensation for each of the slides, including compound slide 26, cross slide 30, left auxiliary slide 44, and right auxiliary slide 46. The control circuit 71 is divided into four independent control channels 72, 74, 76 and 78, each control channel being associated on a one-to-one basis with a slide. A description of control channel 72 is exemplary of each of the independent control channels, and is presented as follows.

The control channel 72 includes a comparator 82 having positive and negative inputs 84 and 86, respectively. The positive input 84 receives a command indicative of the offset or compensation required for its associated slide, in this case the compound slide. The negative input 86 receives a feedback signal from the sensor means that is responsive to the position of the slide; the feedback signal being hereinafter explained more precisely. The comparator 82 outputs a difference or error signal on line 88 proportionate to the difference between the signal on inputs 84 and 86.

In the preferred form, both signals 84 and 86 to the comparator 82 are digital in format, and likewise the output signal appearing on line 88 has a digital format. The digital signal on line 88 is input directly to a digital-to-analog converter 90, which may be selected from any of the various types known in the art, for conversion to an equivalent analog signal.

The analog signal appearing on line 92 is input directly to a filter 94 to filter out any artifacts or transient signals appearing in the analog output of the converter 90. The filtered analog output signal is directly received by the positive input 96 of a drive amplifier 100. The drive amplifier 100 also has a negative input 98 which receives a motor feedback signal that will hereinafter be discussed in greater detail. The drive amplifier 100 outputs an amplified motor drive signal on line 102 to the servo-drive motor 104 that drives the compound slide 26.

A tachometer 108 or similiar type motor speed sensing device is coupled to the output shaft of the motor 104 to sense the angular velocity 106 of the motor shaft. The output signal of the tachometer 108 is directly applied to the negative input 98 of the drive amplifier 100 to provide negative feedback to stabilize the driving of the motor 104.

The shaft of the motor 104 is coupled to a ball screw-drive 110 that transmits the output of the motor to the compound slide 26. A resolver 116 is coupled to the ball screw-drive 110 and senses the amount of motion, as represented by signal 112, that it transmits to the compound slide 26. The resolver 116 outputs an analog signal 120 representative of the angular displacement 112 of the ball screw 110. The analog signal 120 is received by a counter 118 that converts it to an equivalent digital representation 122. The digital output signal 122 of the counter 118 is applied to the negative input 86 of the comparator 82, and defines the earlier-referenced feedback signal. The resolver 116 and counter 118 together form a slide position transducer 114.

The operation of the invention will now be described in two exemplary situations, presented as follows:

First, is the situation where the machine operator determines that the tool 54 on the turret 50 of the right auxiliary slide 46 requires an offset in the +Z direction, and the tool 52 of turret 48 on the left auxiliary slide 44 is properly positioned and needs no offset or compensation. The offset of tool 54 will require displacement of the compound slide 26 in the +Z direction an amount equal to the offset required for tool 54. Similarly, a counter-offset will be required for tool 52 to compensate for the offset of tool 54.

Accordingly, the operator will enter offset and counter-offset commands into the control unit 16 of FIG. 1. These commands correspond to the digital command signal appearing at input 84 of comparator 82 in control channel 72, and input 84''' of comparator 82''' in control channel 78.

With specific reference to control channel 72, the digital command appearing on input 84 will be compared against the digital signal on line 86 representing the present position of the compound slide 26. A difference signal appearing on line 88 is proportionate to the difference between the command and feedback signals 84 and 86 respectively. The difference signal 88 is converted to analog form by converter 90. The analog output appearing on line 92 is received by the filter 94. The filtered analog signal is applied to the positive input 96 of the drive amplifier 100. The output of the drive amplifier 100 appearing on line 102 energizes the compound slide servo-drive motor 104 causing a change in position of the motor output shaft. The shaft output 106 is applied to the ball screw-drive 110 which transmits motion 112 to the compound slide 26.

The motion 112 transmitted by the ball screw-drive 110 is sensed by the resolver 116 forming part of the slide position transducer 114. The resolver outputs an analog signal 120 representative of the motion 112 to the counter 118. The counter 118 outputs an equivalent digital representation of signal 120 in the form of feedback signal 122. The feedback signal 122 is applied to the negative input 86 of the comparator 82. This iterative process recurs until the comparator output signal, i.e. the difference signal 88, nulls out, indicating that the compound slide 26 has been moved to the commanded position. The counter-offset of the left auxiliary slide 44 is accomplished through the same signal processing procedure in control channel 78, and for brevity of description will not be repeated in full detail.

In the second exemplary situation, the operator determines that an offset is required for tool 54 in the +X direction. In this case, the right auxiliary slide 46 can be independently moved along the U-axis to accomplish the desired offset; there is no required counter-offset of auxiliary slide 44. Accordingly, a command is entered by the operator in the control unit 16 of FIG. 1 indicating the need for the specified offset or compensation of tool 54. A corresponding digital command signal then appears at input 84'' of comparator 82'' of control channel 76. The processing of this command through control channel 76 is exactly analagous to the processing of a command to control channel 72, and for purposes of brevity, a detailed description of the signal processing will not be repeated.

The invention has been described in terms of an illustrative embodiment, and it is to be understood that the terminology used herein is in the nature of illustration and not of limitation.

Many modifications and variations of the present invention are possible in light of the above teachings. It is, therefore, to be understood that within the scope of the appended claims the invention may be practiced otherwise than as specifically described.

What is claimed is:

1. A biaxial turning machine comprising:
   support means, first and second spindle means, mounted on the support means, for rotating respective first and second workpieces, the first and second spindle means having parallel axes of rotation;

compound slide member means, mounted on the support means in sliding relation thereto, for motion in a first direction with respect to the spindle means axes;

cross slide member means mounted on the compound slide member means in sliding relation thereto, for motion in a second direction transverse to the first direction;

first tool holder member means mounted on the cross slide member means in sliding relation thereto, for holding a workpiece machining tool and for motion parallel to the first direction;

second tool holder member means, mounted on the cross slide member means in sliding relation thereto, for holding another workpiece machining tool, and for motion parallel to the second direction;

a plurality of axis drive means, one each of the axis drive means associated with each of the member means, for moving each of the associated member means;

a plurality of sensor means, one each of the sensor means associated with each of the axis drive means, for sensing motion of each of the member means and outputting a signal representative thereof; and control means, responsive to a position command signal for a specific member means and to the output signal of the sensor means associated with the specific member means, for controlling the axis drive means to position the specific member means in accordance with the command signal.

2. The invention as defined in claim 1, wherein the control means comprises a plurality of independent control channels, in like number to the axis drive means, each control channel being associated with one of the axis drive means.

3. The invention as defined in claim 2, wherein each of the control channels comprises, comparator means for comparing a command signal and sensor output signal associated with the axis drive means and producing a difference signal in accordance with the difference therebetween; and driver means, intercoupled between the comparator means and associated axis drive means, and responsive to the difference signal for energizing the associated axis drive means in accordance with the difference signal.

4. The invention as defined in claim 3, wherein the axis drive means includes a motor, and the driver means is further defined to include, a drive amplifier having positive and negative inputs, and a tachometer associated with the motor output, the drive amplifier receiving the difference signal at its positive input and the tachometer output at its negative input, thereby stabilizing the driving of the motor.

5. The invention as defined in claim 3, wherein the command signal is in digital format, and the sensor means includes A/D means for converting the sensor signal from analog to digital format.

6. The invention as defined in claim 1, wherein the support means comprises an assembled knee and columnar member, the columnar member having guideways for the sliding motion of the compound slide member.

7. The invention as defined in claim 1, wherein each of the axis drive means comprises a drive motor and a ball screw drive intercoupled between the drive motor and associated member means.

8. The invention as defined in claim 1, wherein each of the tool holder means comprises turret means for selectively positioning one of a plurality of tools in place for a machining operation.

9. In an automated turning machine of the type having support means, first and second spindles having parallel axes of rotation, each spindle being adapted to rotate a workpiece as it is subjected to a machining operation by a tool movable with respect to the axes of rotation, the subcombination comprising:

a compound slide mounted in sliding relation on the support means for motion in a first direction with respect to the axes of rotation;

a cross slide mounted in sliding relation on the compound slide for motion in a second direction transverse to the first direction;

a first auxiliary slide, carrying a first tool holder, mounted in sliding relation on the cross slide for motion in the first direction;

a second auxiliary slide, carrying a second tool holder, mounted in sliding relation on the cross slide for motion in the second direction;

a plurality of axis drive means, one each associated with each of the slides, for moving its associated slide;

a plurality of sensor means, one each associated with each of the axis drive means, for sensing motion of an associated slide and outputting a signal representative thereof; and control means, responsive to a position command signal for a specific slide and to the output signal of the sensor means associated with the specific slide, for controlling the associated axis drive means to position the specific slide in accordance with the command signal.

10. The invention as defined in claim 9, wherein the control means comprises a plurality of independent control channels, in like number to the axis drive means, each control channel being associated with one of the axis drive means and comprising, a comparator means for comparing a command signal and sensor output signal and producing a difference signal in accordance with the difference therebetween, and driver means, intercoupled between the comparator means and associated axis drive means, and responsive to the difference signal for energizing its associated axis drive means in accordance with the difference signal.

* * * * *